C. R. PALMER.
PNEUMATIC SPRING FOR VEHICLES.
APPLICATION FILED DEC. 16, 1910.
1,013,808.
Patented Jan. 2, 1912.
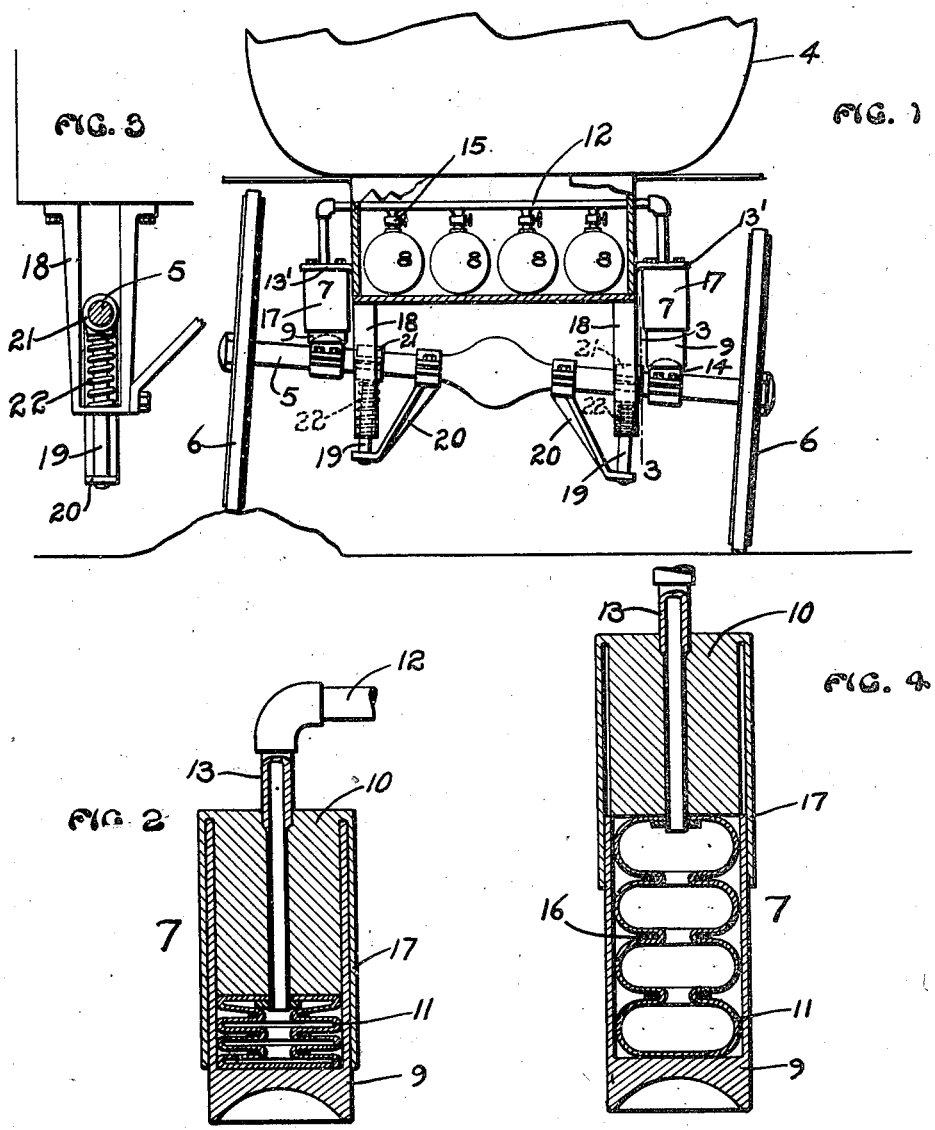

UNITED STATES PATENT OFFICE.

CHARLES R. PALMER, OF CINCINNATI, OHIO.

PNEUMATIC SPRING FOR VEHICLES.

1,013,808.  Specification of Letters Patent.  Patented Jan. 2, 1912.

Application filed December 16, 1910. Serial No. 597,673.

*To all whom it may concern:*

Be it known that I, CHARLES R. PALMER, a citizen of the United States of America, and resident of Cincinnati, county of Hamilton, and State of Ohio, have invented certain new and useful Improvements in Pneumatic Springs for Vehicles, of which the following is a specification.

This invention relates to supporting means for the body portion of automobiles, motor cars and other vehicles, and has for an object to produce pneumatic means for supporting the body portions of such vehicles on the axles or frame of the vehicle.

A further object is to produce an air or pneumatic spring for vehicles, which is provided with means for preventing the dissipation of the operating pressure.

A further object is to provide means by varying the resiliency of the pneumatic spring, to accommodate variations in the load on the vehicle.

These and other objects I attain by means of an apparatus embodying the features herein described, and illustrated in the drawings accompanying this application and forming a part thereof.

In the drawings, Figure is a partial rear elevation of a motor car provided with an embodiment of my invention; portions of the car are shown in section, for convenience of illustration. Fig. 2 is a sectional view of a pneumatic spring, which forms a part of my invention, and which is shown in the compressed position. Fig. 3 is a section on line 3—3 of Fig. 1. Fig. 4 is a sectional view of a pneumatic spring, and illustrates the relative positions of the parts when the spring is extended.

The motor car illustrated in the drawings is provided with a body portion 4 and a frame portion, which includes axles 5, on which the wheels 6 are mounted. In the drawings, I have shown only the rear axle, and, for convenience of illustration, have simplified the construction of the frame portion and omitted the driving gears of the car.

The embodiment of my invention illustrated, consists of pneumatic springs 7, which are located between the body 4 and the frame portion of the car and are in communication with one or more pressure tanks 8, which are located on the body of the car. Each spring 7 consists of a cylinder 9, a piston 10, adapted to coöperate with the cylinder, and a flexible tube or bellows 11, located within the cylinder, and connecting with the piping 12 by means of a pipe 13, which extends through an opening provided in the piston 10. The inner end of the pipe 13 is hermetically connected to the tube by any suitable means, so as to prevent the leakage of air from the tube. Each piston 10 is secured to the body of the car by means of a bracket 13', and each cylinder 9 is secured near one end of the axles 5 by means of a suitable ball and socket joint connection 14, or any other connection which will permit of relative motion between the axle and the cylinder. The piping 12 communicates with the tanks 8. A separate valve 15 is located between each tank 8 and the piping 12, so that communication between the piping and one or all of the tanks may be shut off, if desired. Each tube 11 is initially distorted by providing encircling fiber or fabric bands 16 at points along the length of the tube, which are so located that the tube will crease in symmetrical folds, when compressed by the piston 10. Each piston is provided with an integrally formed apron 17, which projects downwardly around the outside of the cylinder 9, for the purpose of preventing dust and grit from entering the cylinder, and also for the purpose of guiding the plunger during its reciprocations relative to the cylinder.

In the drawings, I have illustrated the springs 7, between the rear axle 5 and the body portion, directly connected with the piping 12, and it will be understood that similar springs 7 are located between the body and the front axle of the car, and that the tubes 11 of the front springs may be connected to the pping 12 by any suitable piping, or may be connected to a separate tank.

I have provided means for limiting the relative motion between each axle 5 and the body of the car, which consists of metal straps 18, secured to the body, and guide pins 19 secured to the axles. Each strap 18 is so arranged, that it is looped around one of the axles 5, at a point adjacent to one of the supporting springs 7, and each pin 19 projects through an opening provided in one of the straps and is supported and secured in place at its lower end by means of a bracket 20 secured to the axle. The upper end of each pin is also secured to the axle by means of a bracket 21. A coiled spring 22 surrounds each pin 19 and is located between the loop 18, through which the pin projects, and the supporting axle 5. The purpose of these springs is merely to steady the body portion of the car and to operate in opposition to the resiliency of the pneumatic springs.

In the drawings, I have shown the rear axle 5 in an inclined position, with the left rear wheel on an obstruction in the road, so that the left rear supporting spring 7 is compressed and the right supporting spring is extended. Figs. 2 and 4 respectively, illustrate the relative positions of the parts of the left and right rear springs.

During the ordinary operation of the car, the tanks 8 are subjected to a predetermined air pressure and are all in open communication with the piping 12, consequently the tube 11 of each air spring is subjected to the air pressure in the tanks. Under these conditions the air pressure is effective in supporting the body of the car on the frame portion, and the resiliency of the compressed and confined air is employed in absorbing shocks and preventing the jolts and jars from reaching the body of the car.

I have provided several of the tanks 8, so that I can vary the resiliency of the pneumatic springs to correspond with variations in the load on the car. As the pistons 10 reciprocate relative to the cylinders 9 and compress the tubes 11, it is apparent that the pressure in the communicating air system is increased, and it is equally apparent that this increase of pressure will be greater if the internal volume of the air system is relatively small as compared with the volume of each piston. I therefore decrease the number of tanks in communication with the piping 12, when the load on the car is increased, by shutting off one or more of the valves 15. This decreases the internal volume of the compressed air system, so that the air pressure in the system is materially increased, as the springs 7 are compressed. This increase in pressure, in effect, increases the supporting strength of the springs 7, or increases their power of resisting distortion. As the load on the car is increased, the number of tanks 8 may be decreased by closing the valves 15.

The load encountered by the front axle of a motor car or automobile is more constant than the load encountered by the rear axle, and, consequently, it may be desirable to control the resiliency of the front supporting spring 7 independently of the rear supporting springs. This is accomplished by providing one or more separate compression tanks 8, which communicate with the front springs, and which are independent of the tanks 8 for the rear springs. In the springs illustrated, neither the cylinders 9, nor the pistons 10 are mounted on fixed supports, and, consequently, they are each capable of reciprocating relative to the other. It will be apparent that the cylinders 9 may be mounted on the body of the car, and that the coöperating pistons may be mounted on the axle, without departing from my invention. The arrangement illustrated is advantageous, in that it prevents dust and grit from working its way into the cylinder. One of the advantages of providing the tube 11 in each of the pneumatic springs, is that the compressed air system is hermetically sealed and that the necessity of providing packed joints between reciprocating parts, is eliminated. Such joints are always a source of difficulty and are apt to leak. With my invention there is no opportunity for the leakage of the operating air pressure, since all of the connections employed in the pressure system may be air tight.

By employing my invention, solid or cushioned tires may be employed on the vehicle wheels and the same results will be obtained as if pneumatic tires were employed.

What I claim is:—

1. In combination with a vehicle body and its supporting frame, pneumatic springs located between the body and the frame, pressure tanks communicating with said springs, and valves for varying the number of tanks communicating with said springs.

2. In combination with the body and the supporting frame of a vehicle, pneumatic springs located between said body and said frame and comprising cylinders, compressible tubes located within said cylinders, and pistons located between said cylinders and adapted to operate to compress said tubes, a plurality of tanks communicating with said tubes, and valves for controlling the communication between each tank and said tubes.

3. A pneumatic spring comprising a cylinder, a piston located within said cylinder and provided with an integrally formed annular apron which surrounds said cylinder, a pneumatic bellows located within said cylinder below said piston, and a source of pneumatic pressure communicating with said bellows.

4. A pneumatic spring comprising a cylinder, a piston located within said cylinder, a pneumatic bellows located within said cylinder below said piston, a source of pneumatic pressure communicating with said bellows, and means for varying the effective operating pressure within said bellows.

5. A pneumatic spring comprising a cylinder, a piston located within said cylinder, a pneumatic bellows located within said cylinder below said piston, a plurality of pressure tanks, means for connecting said tanks to said bellows, and means for varying the number of tanks in communication with said bellows.

6. In combination with the body and supporting frame of a vehicle, pneumatic springs located between said body and said frame and comprising cylinders secured to said frame, pistons located within said cylinders and secured to said body, pneumatic bellows located within said cylinders below said pistons, a plurality of pressure tanks communicating with said bellows through passages formed in said pistons, and valves for varying the number of tanks in communication with said bellows.

CHARLES R. PALMER.

Witnesses:
 WALTER F. MURRAY,
 E. W. McCALLISTER.